J. Lefever & G. W. Shults. Pulverizer.
No. 120,446. Fig. 1. Patented Oct. 31, 1871.
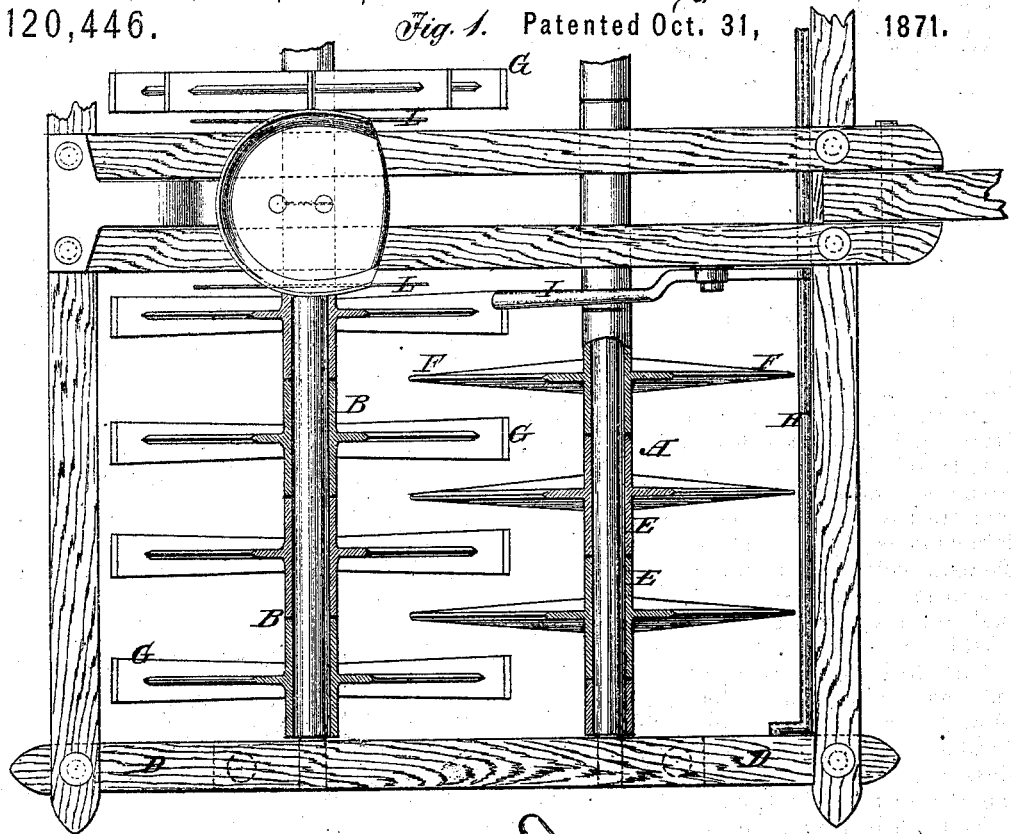
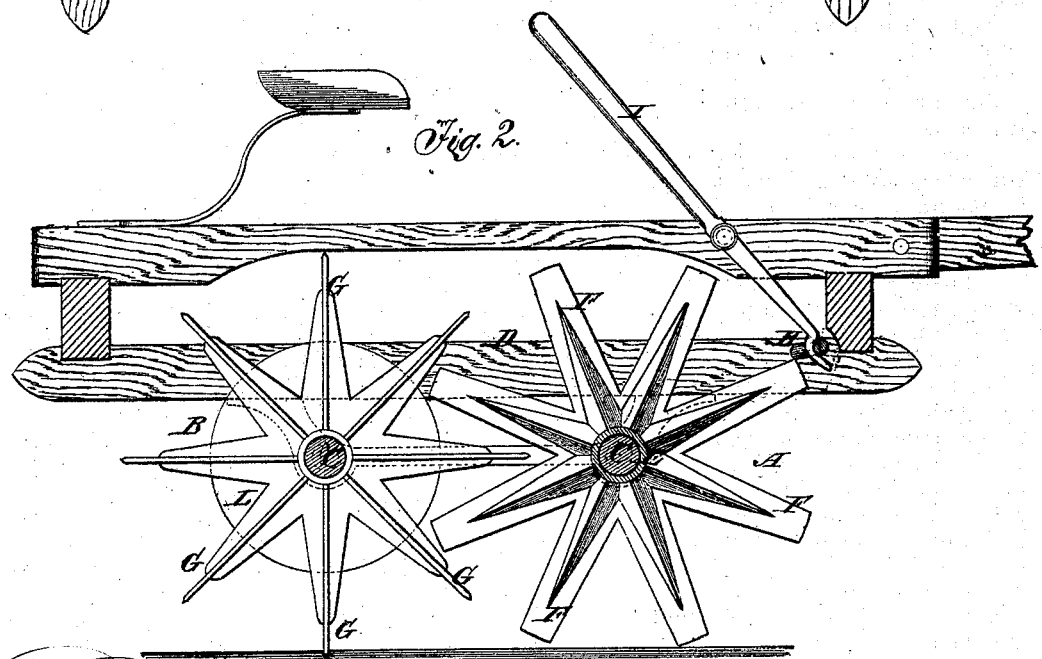
Witnesses:
Gustave Dieterich
G. S. Mabee
Inventor:
J. Lefever
G. W. Shults
per Munn & Co.
Attorneys.

UNITED STATES PATENT OFFICE.

JAMES LEFEBER AND GEORGE W. SHULTS, OF CAMBRIDGE CITY, INDIANA.

IMPROVEMENT IN EARTH-PULVERIZERS AND HARROWS.

Specification forming part of Letters Patent No. 120,446, dated October 31, 1871; antedated October 21, 1871.

*To all whom it may concern:*

Be it known that we, JAMES LEFEBER and GEORGE W. SHULTS, of Cambridge City, in the county of Wayne and State of Indiana, have invented a new and Improved Earth-Pulverizer and Harrow; and we do hereby declare that the following is a full, clear, and exact description thereof, which will enable others skilled in the art to make and use the same, reference being had to the accompanying drawing forming part of this specification.

Our invention relates to a new way of more effectually pulverizing cloddy ground after the plow by arranging the broad points of rotary crushers in two sets, which act on the clod in lines at an angle to each other, and in a novel mode of locking the front crushers.

Figure 1 is a plan view of our improved machine, and Fig. 2 is a longitudinal section of the same.

Similar letters of reference indicate corresponding parts.

A represents a front set, and B a rear set of star-wheels arranged on horizontal parallel shafts C extending across the frame D mounted on them vertically to the direction in which the apparatus is to move. Each star-wheel works independently of the other, and has a hub, E, working at the end against the hub of the wheel on each side, or one end of the hub of each outside wheel works against the frame. The arms of each set of wheels are arranged to work between the arms of the other set at the sides between them for cleaning each other. The points F of the arms of the front set are made broadest in the planes of rotation of the said wheels for cutting notches or channels in the ground in the direction of the movement of the machine, and the points G of the rear set are made broadest in the planes of the axles to cut across or perpendicular to the cuts made by the front set for increasing the cutting action on the ground, and these latter points are made broader at the outer ends than toward the axle for facilitating the escape of the stones, clods, or other matters which might wedge between them if they were narrowest at the points. H is a cranked rod extending across the frame parallel with the shafts B, and in such relation that when swung downward the points F of the front set of wheels will be engaged by it so as to be held against rotation, and thereby act as common scratching harrow-teeth. I is a hand-lever pivoted to the frame and arranged with the cranked rod, so that the latter may be lifted out of connection with the points F when they are to be let free to turn, which may be done while in motion. This lever holds the cranked rod out of connection with the said points, and it is raised to let the said rod down to engage them.

We propose to adapt this machine for cultivating each side of a row of plants by removing one or more of the star-wheels from both shafts at the center and applying loose sleeves corresponding to the hubs thereat to confine the remaining wheels in the right positions, so that the vacant spaces may make room for the plants; and for the greater protection of the plants, especially from the action of the points G, which are more likely to throw earth upon them, we apply the protecting-disks L on the shaft inside of the wheels next the space, which effectually prevents any earth being thrown upon them. Such disks may be applied to both shafts, if preferred. When the machine is used for pulverizing and harrowing, these disks are removed and the star-wheels replaced.

Having thus described our invention, we claim as new and desire to secure by Letters Patent—

1. The two sets of star-wheels A B, having straight blades, with their broad ends spread out in planes at right angles to each other, for the purpose specified.

2. In combination with a set of star-wheel pulverizers, A, the rod H and lever I, arranged on the frame, as and for the purpose specified.

JAMES LEFEBER.
GEORGE W. SHULTS.

Witnesses:
ANDREW RAYMOND,
NATHAN RAYMOND.